United States Patent
Sun et al.

(10) Patent No.: US 11,290,256 B2
(45) Date of Patent: *Mar. 29, 2022

(54) BLOCKCHAIN-BASED ADVERTISEMENT MONITORING METHOD AND APPARATUS, AND ELECTRONIC DEVICE

(71) Applicant: ADVANCED NEW TECHNOLOGIES CO., LTD., Grand Cayman (KY)

(72) Inventors: Jiankang Sun, Hangzhou (CN); Feng Lin, Hangzhou (CN)

(73) Assignee: ADVANCED NEW TECHNOLOGIES CO., LTD., George Town (KY)

(*) Notice: Subject to any disclaimer, the term of this patent is extended or adjusted under 35 U.S.C. 154(b) by 0 days.

This patent is subject to a terminal disclaimer.

(21) Appl. No.: 17/210,638

(22) Filed: Mar. 24, 2021

(65) Prior Publication Data

US 2021/0306137 A1     Sep. 30, 2021

Related U.S. Application Data

(63) Continuation of application No. 16/848,765, filed on Apr. 14, 2020, now Pat. No. 10,992,460, which is a
(Continued)

(30) Foreign Application Priority Data

Apr. 23, 2019   (CN) .......................... 201910329974.7

(51) Int. Cl.
  *G06Q 30/02*     (2012.01)
  *H04L 9/32*      (2006.01)
(Continued)

(52) U.S. Cl.
  CPC ....... *H04L 9/0643* (2013.01); *G06Q 30/0269* (2013.01); *H04L 9/006* (2013.01); *H04L 9/3247* (2013.01); *H04L 2209/38* (2013.01)

(58) Field of Classification Search
  None
  See application file for complete search history.

(56) References Cited

U.S. PATENT DOCUMENTS

| 9,928,290 | B2 | 3/2018 | Tiell |
| 9,965,804 | B1 | 5/2018 | Winklevoss et al. |

(Continued)

FOREIGN PATENT DOCUMENTS

| CN | 108182607 A | 6/2018 |
| CN | 108965950 A | 12/2018 |

(Continued)

OTHER PUBLICATIONS

Anjum et al., Blockchain Standards for Compliance and Trust, 2017, IEEE Cloud Computing, pp. 84-90 (Year: 2017).*

(Continued)

*Primary Examiner* — Luu T Pham
*Assistant Examiner* — Edward X Long (57) ABSTRACT

The specification discloses a blockchain-based advertisement monitoring method and apparatus, and an electronic device. The method may include: obtaining, by a playing device, an advertisement resource; at each of a plurality of different time points while playing the advertisement resource, collecting, by the playing device, screenshots of the advertisement resource; generating, by the playing device, a plurality of signatures based on the collected screenshots, an device identifier of the playing device, and a private encryption key of the playing device; generating, by the playing device, verification information based on the (Continued)

plurality of signatures; and uploading, by the playing device, the verification information to a blockchain network.

13 Claims, 4 Drawing Sheets

Related U.S. Application Data continuation of application No. PCT/CN2020/071362, filed on Jan. 10, 2020.

(51) Int. Cl.
*H04L 9/06* (2006.01)
*H04L 9/00* (2006.01)

(56) References Cited

U.S. PATENT DOCUMENTS

| | | | |
|---|---|---|---|
| 10,147,088 B2 | 12/2018 | Sahasranaman et al. | |
| 10,176,309 B2 | 1/2019 | Tormasov et al. | |
| 2012/0044137 A1 | 2/2012 | Oddiraju et al. | |
| 2014/0281004 A1* | 9/2014 | Bridges | H04N 21/4622 709/231 |
| 2014/0380408 A1 | 12/2014 | Ginter et al. | |
| 2015/0245084 A1 | 8/2015 | Downing et al. | |
| 2016/0034896 A1 | 2/2016 | O'Brien et al. | |
| 2016/0379330 A1* | 12/2016 | Powers | G06T 1/0028 382/100 |
| 2017/0048216 A1 | 2/2017 | Chow et al. | |
| 2017/0075877 A1 | 3/2017 | Lepeltier | |
| 2017/0163733 A1 | 6/2017 | Grefen et al. | |
| 2017/0206523 A1 | 7/2017 | Goeringer et al. | |
| 2017/0236120 A1 | 8/2017 | Herlihy et al. | |
| 2017/0337534 A1 | 11/2017 | Goeringer et al. | |
| 2018/0302417 A1 | 10/2018 | Wilson | |
| 2019/0073666 A1 | 3/2019 | Ortiz et al. | |
| 2019/0342528 A1 | 11/2019 | Broaddus | |
| 2019/0354943 A1* | 11/2019 | Mulye | H04N 21/2407 |
| 2020/0143143 A1 | 5/2020 | Osiecki | |
| 2020/0162236 A1* | 5/2020 | Miller | G06F 16/2379 |

FOREIGN PATENT DOCUMENTS

| | | |
|---|---|---|
| CN | 108985818 A | 12/2018 |
| CN | 109447676 A | 3/2019 |
| CN | 109472634 A | 3/2019 |
| CN | 110020899 A | 7/2019 |

OTHER PUBLICATIONS

Hari et al., The Internet Blockchain, A Distritubed, Tamper-Resistent Transaction Framework for the Internet, 2016, HotNets-XV, Nov. 9-10, 2016, Atlanta, GA (Year: 2016).*
First Search dated Mar. 25, 2020, issued in related Chinese Application No. 201910329974.7 (1 page).
First Office Action dated Apr. 2, 2020, issued in related Chinese Application No. 201910329974.7, with English machine translation (16 pages).
Xu et al., Blockchain-based decentralized content trust for docker, 2018, Multimed Tools Appl (2018) 77 : 18223-18248 (Year: 2018).
Sutton, et al., Blockchain Enabled Privacy Audit Logs, 2017 McMaster University, Department of Computing and Software, pp. 1-16 (Year: 2017).
Written Opinion and International Search Report for PCT Application No. PCT/CN2020/071362 made available to public on Oct. 29, 2020.

* cited by examiner

BLOCKCHAIN-BASED ADVERTISEMENT MONITORING METHOD AND APPARATUS, AND ELECTRONIC DEVICE

CROSS REFERENCE TO RELATED APPLICATIONS

The application is a continuation application of the U.S. patent application Ser. No. 16/848,765, filed on Apr. 14, 2020, and entitled "BLOCKCHAIN-BASED ADVERTISEMENT MONITORING METHOD AND APPARATUS, AND ELECTRONIC DEVICE," which is a continuation application of International Patent Application No. PCT/CN2020/071362, filed on Jan. 10, 2020. The International Patent Application No. PCT/CN2020/071362 claims priority to Chinese Patent Application No. 201910329974.7, filed on Apr. 23, 2019. The entire contents of all of the above referenced applications are incorporated herein by reference.

TECHNICAL FIELD

The application relates to the field of computer technologies, and in particular, to a blockchain-based advertisement monitoring method and apparatus, and an electronic device.

BACKGROUND

Currently, in order to improve effects of advertisements, advertisers increasingly choose to place offline electronic advertisements on advertisement playing devices in public areas such as buildings, elevators, cinemas, communities, and bus stops. In order to learn a placing status of electronic advertisements on the advertisement playing devices in a timely manner to determine whether unexpected cases such as wrong placement and abnormal playing of the electronic advertisements occur, an advertisement placing party usually needs to send manpower to an advertisement playing site to view an actual placing status of the electronic advertisements.

However, there are various disadvantages by monitoring an advertisement placing status at a playing site using manpower. On the one hand, obtained playing evidences are often manually taken photographs that are likely to be tampered with, and therefore authenticity of the photographs cannot be ensured, and manual costs are relatively high and monitoring efficiency is also relatively low. On the other hand, in the manual manner, an error is unavoidable, and accurate advertisement playing data cannot be provided. Therefore, it is difficult to rely on the manual monitoring to optimize a placing effect of offline electronic advertisements.

Reducing manual costs for monitoring a placing status of the offline electronic advertisements and improving efficiency and accuracy of monitoring advertisement playing become a technical problem urgently to be resolved.

SUMMARY

Embodiments of the specification provide a blockchain-based advertisement monitoring method and apparatus, and an electronic device, to resolve existing problems such as relatively high manual costs for monitoring a placing status of offline electronic advertisements and relatively low efficiency and relatively low accuracy of monitoring of advertisement playing.

In order to resolve the foregoing technical problems, the embodiments of the specification are implemented as follows.

In a first aspect, a blockchain-based advertisement monitoring method is provided. The method is applied to an advertisement monitoring apparatus and includes: obtaining, by a playing device, an advertisement resource; at each of a plurality of different time points while playing the advertisement resource, collecting, by the playing device, screenshots of the advertisement resource; generating, by the playing device, a plurality of signatures based on the collected screenshots, an device identifier of the playing device, and a private encryption key of the playing device; generating, by the playing device, verification information based on the plurality of signatures; and uploading, by the playing device, the verification information to a blockchain network.

In some embodiments, the obtaining the advertisement resource comprises: sending the device identifier of the playing device to a cloud platform; and receiving the advertisement resource from the cloud platform, wherein the cloud platform stores a mapping between the advertisement resource and the device ID of the playing device.

In some embodiments, the generating the plurality of signatures comprises: generating a digest based on the collected screenshots; generating a first signature of the plurality of signatures by encrypting the digest using the private encryption key of the playing device; and generating a second signature of the plurality of signatures by encrypting the device identifier of the playing device using the private encryption key of the playing device.

In some embodiments, the generating the verification information comprises: generating the verification information based on the first signature, the second signature, and the device identifier.

In some embodiments, the generating the plurality of signatures comprises: combining the screenshots and the device identifier; generating a digest by applying a hash algorithm on the combination; generating a first signature of the plurality of signatures by encrypting the device identifier of the playing device using the private encryption key of the playing device; and generating a second signature of the plurality of signatures by encrypting the digest using the private encryption key of the playing device.

In some embodiments, the generating the verification information comprises: generating the verification information based on the first signature, the second signature, and the device identifier.

In some embodiments, the generating the plurality of signatures comprises: combining the screenshots, the device identifier, and timestamps of the screenshots; generating a digest by applying a hash algorithm on the combination; generating a first signature of the plurality of signatures by encrypting the digest using the private encryption key of the playing device; and generating a second signature of the plurality of signatures by encrypting the device identifier of the playing device using the private encryption key of the playing device.

In some embodiments, the generating the verification information comprises: generating the verification information based on the first signature, the second signature, the digest, and the timestamps.

In some embodiments, the generating the plurality of signatures comprises: generating a digest based on the collected screenshots; generating a first signature by encrypting the digest using the private encryption key of the playing device; generating a second signature by encrypting the device identifier of the playing device using the private encryption key of the playing device; and generating a third signature by encrypting length-and-width pairs of the screenshots using the private encryption key of the playing device.

In some embodiments, the generating the verification information comprises: generating the verification information based on the first signature, the second signature, the third signature, the device ID, and the length-and-width pairs of the screenshots.

In a second aspect, a system for blockchain-based advertisement monitoring is described. The system comprises one or more processors and one or more non-transitory computer-readable memories coupled to the one or more processors and configured with instructions executable by the one or more processors to cause the system to perform operations comprising: obtaining an advertisement resource; at each of a plurality of different time points while playing the advertisement resource, collecting screenshots of the advertisement resource; generating a plurality of signatures based on the collected screenshots, an device identifier of the playing device, and a private encryption key of the playing device; generating verification information based on the plurality of signatures; and uploading the verification information to a blockchain network.

In a third aspect, a non-transitory computer-readable storage medium for blockchain-based advertisement monitoring is configured with instructions executable by one or more processors to cause the one or more processors to perform operations comprising: obtaining an advertisement resource; at each of a plurality of different time points while playing the advertisement resource, collecting screenshots of the advertisement resource; generating a plurality of signatures based on the collected screenshots, an device identifier of the playing device, and a private encryption key of the playing device; generating verification information based on the plurality of signatures; and uploading the verification information to a blockchain network.

The foregoing technical solutions used in the embodiments of the specification can achieve at least the following technical effects.

During monitoring of an advertisement played on an offline electronic display screen, the screenshot image of the target advertisement and the identification information of the playing device may be obtained. The corresponding blockchain verification information may be generated based on the screenshot image and the identification information of the playing device. The blockchain verification information may be used for verifying the screenshot image and the identification information. Then the blockchain verification information is uploaded to the blockchain. Based on a non-tamperable feature of the information recorded in the blockchain, the screenshot image of the target advertisement and the identification information of the playing device are uploaded to the blockchain. On the one hand, human resources required for advertisement monitoring are saved and efficiency is improved. On the other hand, it is ensured that the playing status of the advertisement is authentic and effective.

When the verification node in the blockchain verifies the playing status of the target advertisement, the blockchain verification information of the target advertisement may be obtained from a blockchain. The blockchain verification information includes the identification information of the playing device. Then the advertisement resource corresponding to the identification information of the playing device may be obtained. Finally, the playing status of the target advertisement may be verified based on the blockchain verification information and the advertisement resource corresponding to the identification information of the playing device. Based on the non-tamperable feature of the information recorded in the blockchain, the verification node obtains the blockchain verification information of the target advertisement from the blockchain and verifies the playing status based on the blockchain verification information of the target advertisement. On the one hand, workload of manually verifying the playing status of the target advertisement is reduced and efficiency is improved. On the other hand, it is ensured that the playing status of the advertisement determined by the verification node is authentic and effective.

BRIEF DESCRIPTION OF THE DRAWINGS

The accompanying drawings described herein are used for providing further understanding for this application and constitute a part of this application. Exemplary embodiments of this application and descriptions thereof are used for explaining this application and do not constitute an improper limitation to this application. In the figures.

DETAILED DESCRIPTION OF THE INVENTION

To make the objectives, technical solutions, and advantages of this application clearer, the following clearly and completely describes the technical solutions of this application with reference to specific embodiments of this application and the corresponding accompanying drawings. Apparently, the described embodiments are only some embodiments rather than all the embodiments of this application. All other embodiments obtained by a person of ordinary skill in the art based on the embodiments of this application without creative efforts shall fall within the protection scope of this application.

The technical solution provided by various embodiments of this application will be described in detail below with reference to the accompanying drawings.

In order to resolve existing problems such as relatively high manual costs for monitoring a placing status of offline electronic advertisements and relatively low efficiency and relatively low accuracy of monitoring of advertisement playing, the embodiments of the present specification provide a blockchain-based advertisement monitoring method. The method provided in the embodiments of the present specification may be implemented by, but not limited to, at least one type of apparatuses, such as an advertisement monitoring apparatus and the like.

For ease of description, an implementation of the method is described below using an advertisement monitoring apparatus as an example. The advertisement monitoring apparatus is merely an example and should not be understood as a limitation to the method.

Figure 1:
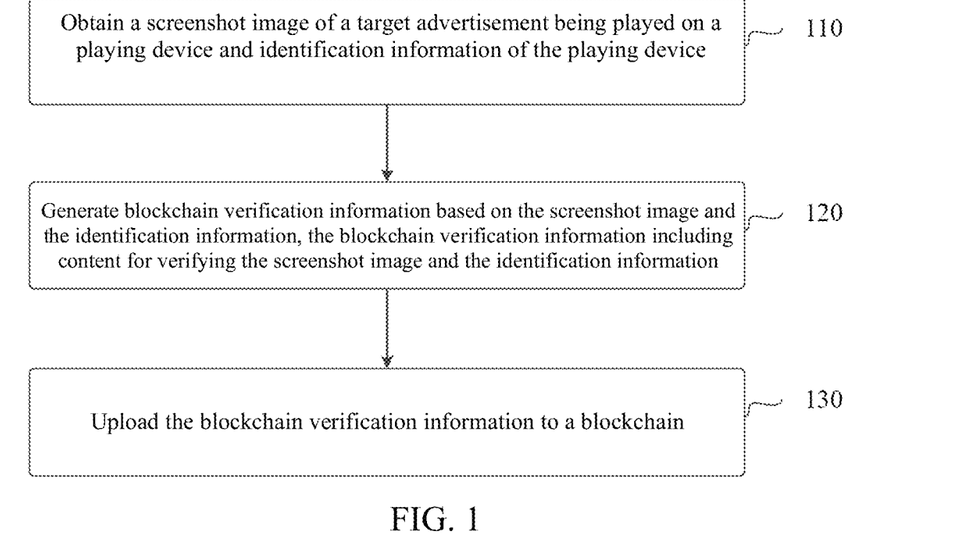
FIG. 1 is a schematic flowchart of implementation in which a blockchain-based advertisement monitoring method is applied to an advertisement monitoring apparatus, according to an embodiment of the present specification.

In particular, FIG. 1 is a schematic flowchart of implementation of a blockchain-based advertisement monitoring method according to one or more embodiments of the present specification. The method includes the following steps.

Step 110: A screenshot image of a target advertisement being played by a playing device and identification information of the playing device are obtained.

In order to obtain, in real time, the screenshot image, a monitoring application may be built in the playing device. A timing screenshot function may be set in the monitoring application, that is, a screenshot operation may be performed on a played image on the playing device at every preset time interval.

Step 120: Blockchain verification information is generated based on the screenshot image and the identification information.

In some embodiments, because each block in the blockchain has a limited storage space, and therefore is generally not suitable to store excessive data. In this case, information such as an original screenshot image may be encrypted using a digest algorithm to obtain a digest of the original information, and then the digest of the original information is uploaded to the blockchain. In this case, generating blockchain verification information based on the screenshot image and the identification information: obtaining a digest of the screenshot image; obtaining a first signature for the digest of the screenshot image and a second signature for the identification information of the playing device; and generating the blockchain verification information based on the first signature, the second signature, and the identification information of the playing device.

In some embodiments, the digest of the screenshot image may be obtained using an image hash algorithm, for example, phash and dhash.

In some embodiments, the screenshot image and the identification information of the playing device may be further combined, and a digest of combined information may be obtained by applying a hash algorithm to the combined information. Here, "combining" may mean "being aggregated." In this case, generating blockchain verification information based on the screenshot image and the identification information of the playing device, the blockchain verification information being content for verifying the screenshot image and the identification information of the playing device includes: obtaining a digest of the screenshot image and the identification information of the playing device; obtaining a third signature of the playing device for the digest of the screenshot image and the identification information of the playing device and a second signature of the playing device for the identification information of the playing device; and generating the blockchain verification information based on the third signature, the second signature, and the identification information of the playing device.

In some embodiments, the screenshot image, the identification information of the playing device, and a timestamp of a screenshot time may be further combined, and a digest of combined information is obtained by applying a hash algorithm to the combined information. The blockchain verification information is generated based on a third signature generated based on the digest of the combined information, the second signature of the playing device for the identification information of the playing device, and the timestamp of the screenshot time.

The first signature, the second signature, and the third signature may be obtained through signing using a private key of the playing device. For example, the digest of the screenshot image×the private key=the first signature, the identification information of the playing device×the private key=the second signature, and the digest of (the screenshot image of the playing device+the identification information of the playing device)×the private key=the third signature.

In some embodiments, in order to help search for the data uploaded to the blockchain, after the blockchain verification information is uploaded to the blockchain, the method further includes: obtaining a block address returned by the blockchain, the block address corresponding to a block storing the blockchain verification information.

Step 130: The blockchain verification information is uploaded to the blockchain.

Due to a storage mechanism of the blockchain, data in the blockchain is hardly tampered with. Based on the feature of the blockchain, it is credible that the data stored in the blockchain is non-tamperable. In this case, after the blockchain verification information is uploaded to the blockchain, the blockchain verification information may be prevented from being maliciously tampered with, and it is ensured that the verification node in the blockchain can verify, based on the blockchain verification information, a true playing status of the playing device.

The implementation of the blockchain-based advertisement monitoring method provided in the embodiments of the present specification is described in detail below using a schematic diagram of an actual scenario shown in FIG. 2 as an example. The implementation includes the following steps.

S21: An advertiser provides an advertisement multimedia resource to an advertisement-placing cloud platform.

S22: A local advertisement playing device obtains the advertisement multimedia resource from the advertisement-placing cloud platform and caches the advertisement multimedia resource in a local storage space. The advertisement-placing cloud platform stores a device identifier (ID) of the local advertisement playing device obtaining the advertisement multimedia resource. That is, the cloud platform storing a correspondence between the advertisement multimedia resource and the local advertisement playing device.

S23: A monitoring application is built in the local advertisement playing device, where the monitoring application obtains one or more screenshot images of the advertisement multimedia resource played by the local advertisement playing device. For example, a screenshot image of the advertisement multimedia resource played by the local advertisement playing device may be obtained at every preset time interval. For simplicity, the following discussion uses one screenshot image as an example. It may be obvious for a person in the art to expand the method by using a plurality of screenshot images.

S24: The monitoring application built in the local advertisement playing device may respectively perform signing on a hash value of the screenshot image, the device ID, and a length-width dimension of the screenshot image using a private key stored in SecurityKey, to ensure that the blockchain verification information uploaded to the blockchain is confirmed by the local advertisement playing device.

S25: The monitoring application built in the local advertisement playing device uploads signature information such as a first signature of digest information of the screenshot image, a second signature of the device ID, and a third signature of the length-width dimension of the screenshot image, the device ID, and the length-width dimension of the screenshot image to the blockchain through a preset interface provided by the blockchain. The uploaded signatures information, the device ID, and the length-width dimension of the screenshot image may be referred to as the blockchain verification information.

S26: A verification proxy server (that is, a verification node) in the blockchain obtains the blockchain verification information comprising, for example, the first signature, the second signature, the third signature, and the device ID, from the blockchain.

S27: The verification proxy server obtains to-be-verified digest information of the screenshot image corresponding to the first signature, a to-be-verified device ID corresponding to the second signature, and a to-be-verified length-width dimension of the screenshot image corresponding to the third signature based on a public key corresponding to the device ID.

S28: The verification proxy server obtains the advertisement multimedia resource corresponding to the device ID (device ID is stored in the blockchain verification information) from the advertisement-placing cloud platform after determining that the to-be-verified device ID is consistent with the device ID and that the to-be-verified length-width dimension of the screenshot image is consistent with the length-width dimension of the screenshot image.

S29: The verification proxy server performs a simulation playing operation on the advertisement multimedia resource corresponding to the device ID, to obtain each image of the advertisement multimedia resource corresponding to the device ID and calculate digest information of each image.

S210: Fuzzy matching is performed between the to-be-verified digest information of the screenshot image and the digest information of the each image obtained in S29. If the to-be-verified digest information matches the digest information of one of the images obtained in S29, it is determined that the advertisement multimedia resource corresponding to the device ID is played on the local advertisement playing device, that is, verification succeeds.

During monitoring of an advertisement played on an offline electronic display screen, the screenshot image of the target advertisement being played on the playing device and the identification information of the playing device may be obtained, and the blockchain verification information is generated based on the screenshot image and the identification information of the playing device. The blockchain verification information is content for verifying the screenshot image and the identification information. Then the blockchain verification information is uploaded to the blockchain. Based on a non-tamperable feature of the information recorded in the blockchain, the screenshot image existing when the playing device plays the target advertisement and the identification information of the playing device are uploaded to the blockchain. On the one hand, a lot of human resources required for advertisement monitoring are saved and efficiency is accordingly improved. On the other hand, it is ensured that the playing status of the advertisement is authentic and effective.

Figure 3:
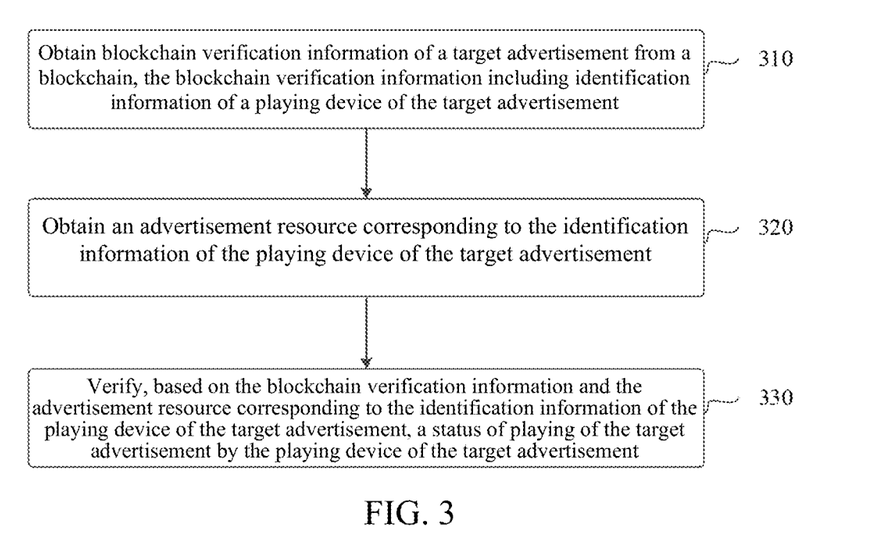
FIG. 3 is a schematic flowchart of implementation in which a blockchain-based advertisement monitoring method is applied to a verification node in a blockchain, according to an embodiment of the present specification.

FIG. 3 is a schematic flowchart of implementation in which a blockchain-based advertisement monitoring method is applied to a verification node in a blockchain, according to an embodiment of the present specification. The implementation includes the following steps.

Step 310: Blockchain verification information of a target advertisement is obtained from a blockchain, the blockchain verification information including identification information of a playing device of the target advertisement.

In some embodiments, the blockchain verification information may include the identification information of the playing device. The verification node may obtain, based on the identification information of the playing device, an advertisement multimedia resource corresponding to the identification information of the playing device from an advertisement-placing cloud platform storing the multimedia resource of the target advertisement.

In some embodiments, the blockchain verification information may further include related information of a screenshot image of the target advertisement being played on the playing device. The verification node may verify, based on the related information of the screenshot image and the advertisement multimedia resource corresponding to the identification information of the playing device, a status of playing by the playing device.

Step 320: An advertisement resource corresponding to the identification information of the playing device is obtained.

In some embodiments, in order to determine whether the target advertisement is played on the playing device, the advertisement resource corresponding to the identification information of the playing device may be obtained from an advertiser or an advertisement-placing cloud platform, to determine whether related information of the screenshot image included in the blockchain verification information matches the related information of a screenshot image when the target advertisement is played.

Step 330: A status of playing of the target advertisement by the playing device is verified based on the blockchain verification information and the advertisement resource corresponding to the identification information of the playing device.

In some embodiments, the blockchain verification information includes a first signature of the playing device for a digest of a screenshot image of the target advertisement, a second signature of the playing device for the identification information of the playing device, and the identification information of the playing device. In this case, verifying a status of playing of the target advertisement by the playing device based on the blockchain verification information and the advertisement resource corresponding to the identification information of the playing device includes: obtaining a public key corresponding to the identification information of the playing device, the public key being used to decrypt the first signature and the second signature; and verifying, based on the public key, the first signature, the second signature, the identification information of the playing device, and the advertisement resource corresponding to the identification information of the playing device, the status of playing of the target advertisement by the playing device.

In some embodiments, the blockchain verification information includes a third signature of the playing device comprising a signed digest of a screenshot image of the target advertisement and the identification information, a second signature of the playing device comprising a signed version of the identification information, and the identification information (e.g., plaintext). In this case, verifying a status of playing of the target advertisement by the playing device based on the blockchain verification information and the advertisement resource corresponding to the identification information of the playing device includes: obtaining a public key corresponding to the identification information of the playing device, the public key being used to decrypt the third signature and the second signature; and verifying, based on the public key, the third signature, the second signature, the identification information of the playing device, and the advertisement resource corresponding to the identification information of the playing device, the status of playing of the target advertisement by the playing device.

In some embodiments, the verifying, based on the public key, the first signature, the second signature, the identification information of the playing device, and the advertisement resource corresponding to the identification information of the playing device, the status of playing of the target advertisement by the playing device includes: obtaining, based on the public key, digest information of a to-be-verified advertisement screenshot obtained after the first signature is decrypted and to-be-verified device identification information obtained after the second signature is decrypted; and if the to-be-verified device identification information is consistent with the identification information of the playing device, verifying, based on the advertisement resource corresponding to the identification information of the playing device and the digest information of the to-be-verified advertisement screenshot, the status of playing of the target advertisement by the playing device.

In some embodiments, the verifying, based on the public key, the third signature, the second signature, the identification information of the playing device, and the advertisement resource corresponding to the identification information of the playing device, the status of playing of the target advertisement by the playing device includes: obtaining, based on the public key, digest information of a to-be-verified advertisement screenshot and identification information obtained after the third signature is decrypted and to-be-verified device identification information obtained after the second signature is decrypted; and if the to-be-verified device identification information is consistent with the identification information of the playing device, verifying, based on the advertisement resource corresponding to the identification information of the playing device and the digest information of the to-be-verified advertisement screenshot and identification information, the status of playing of the target advertisement by the playing device.

The digest information of the to-be-verified advertisement screenshot obtained after the first signature is decrypted may be denoted as the first signature÷the public key, the digest information of the to-be-verified advertisement screenshot and identification information obtained after the third signature is decrypted may be denoted as the third signature÷the public key, and the to-be-verified device identification information obtained after the second signature is decrypted may be denoted as the second signature÷the public key.

In some embodiments, the verifying, based on the advertisement resource corresponding to the identification information of the playing device and the digest information of the to-be-verified advertisement screenshot and identification information, the status of playing of the target advertisement by the playing device includes: playing the advertisement resource corresponding to the identification information of the playing device and obtaining, at an every preset time interval, a played image of the advertisement resource to obtain one or more to-be-matched played images; obtaining one or more to-be-matched digests corresponding to the one or more to-be-matched played images; and if the digest information of the to-be-verified advertisement screenshot matches one of the digests of the to-be-matched played images, determining that the target advertisement is played on the playing device.

In some embodiments, each played image of the advertisement resource corresponding to the identification information of the playing device may be obtained, and fuzzy matching is performed, through searching, between a digest of a to-be-matched played image and a digest of each played image of the advertisement resource, to determine whether the digest of the to-be-matched played image matches one of the digests of the played images of the advertisement resource, and if so, determine that the target advertisement is played on the playing device.

When the verification node in the blockchain verifies the playing status of the target advertisement, the blockchain verification information of the target advertisement may be obtained from a blockchain. The blockchain verification information includes the identification information of the playing device. Then the advertisement resource corresponding to the identification information of the playing device is obtained. Finally, the playing status of the target advertisement may be verified based on the blockchain verification information and the advertisement resource corresponding to the identification information of the playing device. Based on the non-tamperable feature of the information recorded in the blockchain, the verification node obtains the blockchain verification information of the target advertisement from the blockchain and verifies the playing status based on the blockchain verification information of the target advertisement. On the one hand, workload of manually verifying the playing status of the target advertisement is reduced and efficiency is accordingly improved. On the other hand, it is ensured that the playing status of the advertisement determined by the verification node is authentic and effective.

Figure 4:
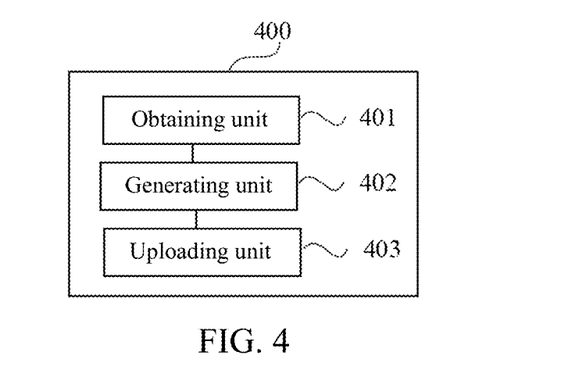
FIG. 4 is a schematic structural diagram of a blockchain-based advertisement monitoring apparatus, according to an embodiment of the present specification.

FIG. 4 is a schematic structural diagram of a blockchain-based advertisement monitoring apparatus 400, according to the present specification. Referring to FIG. 4, in a software implementation, the blockchain-based advertisement monitoring apparatus 400 may include an obtaining unit 401, a generating unit 402, and an uploading unit 403.

The obtaining unit 401 is configured to obtain a screenshot image of a target advertisement being played by a playing device and identification information of the playing device.

The generating unit 402 is configured to generate blockchain verification information based on the screenshot image and the identification information of the playing device, the blockchain verification information being content for verifying the screenshot image and the identification information.

The uploading unit 403 is configured to upload the blockchain verification information to a blockchain.

In some embodiments, the generating unit 402 is configured to: obtain a digest of the screenshot image; obtain a first signature of the playing device comprising the digest of the screenshot image and a second signature of the playing device comprising the identification information of the playing device; and generate the blockchain verification information based on the first signature, the second signature, and the identification information of the playing device.

In some embodiments, the generating unit 402 is configured to: obtain a digest of the screenshot image and the identification information of the playing device; obtain a third signature of the playing device for the digest of the screenshot image and the identification information of the playing device and a second signature of the playing device for the identification information of the playing device; and generate the blockchain verification information based on the third signature, the second signature, and the identification information of the playing device.

In some embodiments, after the loading unit 403 uploads the blockchain verification information to the blockchain, the apparatus further includes: an address obtaining unit 404 configured to obtain a block address returned by the blockchain, a block corresponding to the block address being used to store the blockchain verification information.

Figure 2:
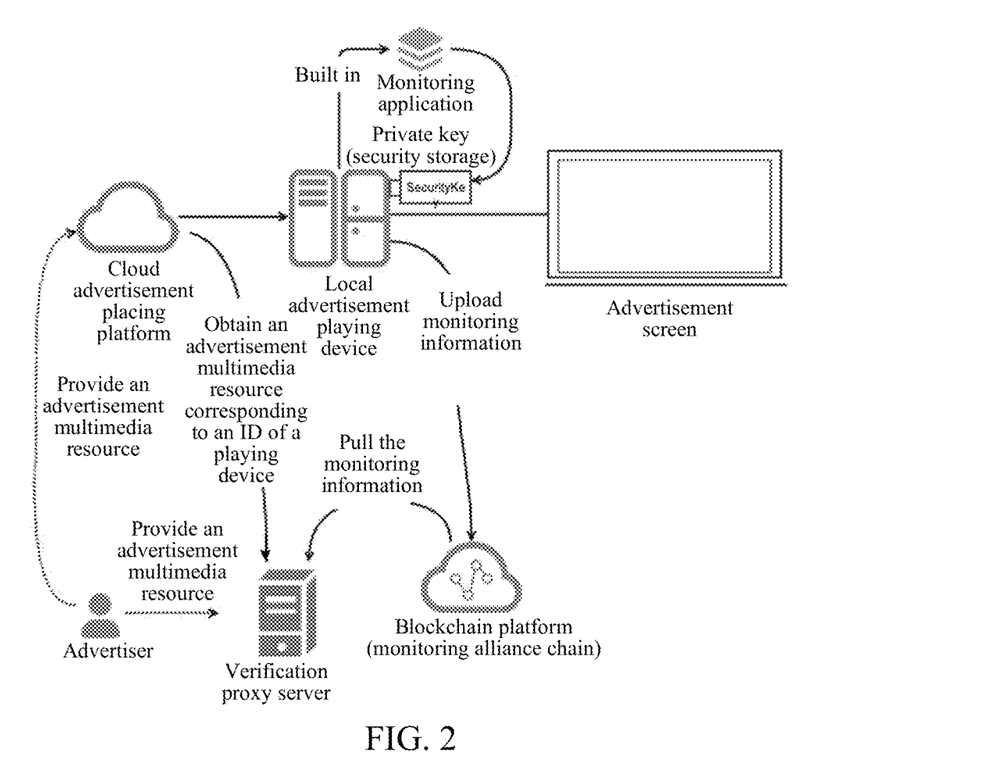
FIG. 2 is a schematic diagram of application of a blockchain-based advertisement monitoring method to an actual scenario, according to an embodiment of the present specification.

The blockchain-based advertisement monitoring apparatus 400 can implement the method in the method embodiments of the FIG. 1 to FIG. 2. For details, refer to the blockchain-based advertisement monitoring method in the embodiments shown in FIG. 1 to FIG. 2, and the details are not described herein again.

Figure 5:
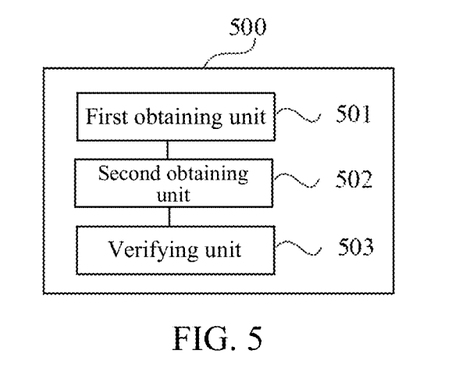
FIG. 5 is a schematic structural diagram of a verification node in a blockchain, according to an embodiment of the present specification.

FIG. 5 is a schematic structural diagram of a verification node 500 in a blockchain, according to the present specification. Referring to FIG. 5, in a software implementation, the verification node 500 in the blockchain may include a first obtaining unit 501, a second obtaining unit 502, and a verifying unit 503.

The first obtaining unit 501 is configured to obtain blockchain verification information of a target advertisement from a blockchain, the blockchain verification information including identification information of a playing device of the target advertisement.

The second obtaining unit 502 is configured to obtain an advertisement resource corresponding to the identification information of the playing device.

The verifying unit 503 is configured to verify, based on the blockchain verification information and the advertisement resource corresponding to the identification information of the playing device, a status of playing of the target advertisement by the playing device In some embodiments, the blockchain verification information includes a first signature of the playing device for a digest of a screenshot image of the target advertisement, a second signature of the playing device for the identification information of the playing device, and the identification information of the playing device. In this case, the verifying unit 503 is configured to: obtain a public key corresponding to the identification information of the playing device, the public key being used to decrypt the first signature and the second signature; and verify, based on the public key, the first signature, the second signature, the identification information of the playing device, and the advertisement resource corresponding to the identification information of the playing device, the status of playing of the target advertisement by the playing device of the target.

In some embodiments, the blockchain verification information includes a third signature of the playing device for a digest of a screenshot image of the target advertisement and the identification information, a second signature of the playing device for the identification information, and the identification information. In this case, the verifying unit 503 is configured to: obtain a public key corresponding to the identification information of the playing device, the public key being used to decrypt the third signature and the second signature; and verify, based on the public key, the third signature, the second signature, the identification information of the playing device, and the advertisement resource corresponding to the identification information of the playing device, the status of playing of the target advertisement by the playing device.

In some embodiments, the verifying unit 503 is configured to: obtain, based on the public key, the first signature, and the second signature, digest information of a to-be-verified advertisement screenshot existing after the first signature is decrypted and to-be-verified device identification information existing after the second signature is decrypted; and if the to-be-verified device identification information is consistent with the identification information of the playing device, verify, based on the advertisement resource corresponding to the identification information of the playing device and the digest information of the to-be-verified advertisement screenshot digest information, the status of playing of the target advertisement by the playing device.

In some embodiments, the verifying unit 503 is configured to: obtain, based on the public key, the third signature, and the second signature, digest information of a to-be-verified advertisement screenshot and identification information existing after the third signature is decrypted and to-be-verified device identification information existing after the second signature is decrypted; and if the to-be-verified device identification information is consistent with the identification information of the playing device, verify, based on the advertisement resource corresponding to the identification information of the playing device and the digest information of the to-be-verified advertisement screenshot and identification information, the status of playing of the target advertisement by the playing device.

In some embodiments, the verifying unit 503 is configured to: play the advertisement resource corresponding to the identification information of the playing device and obtain, at an every preset time interval, a played image of the advertisement resource to obtain one or more to-be-matched played images; obtaining one or more to-be-matched digests corresponding to the one or more to-be-matched played images; and if the digest information of the to-be-verified advertisement screenshot matches one of the digests of the to-be-matched played images, determine that the target advertisement is played on the playing device.

The verification node 500 in the blockchain can implement the method in the method embodiment in the FIG. 3. For details, refer to the blockchain-based advertisement monitoring method in the embodiment shown in FIG. 3, and the details are not described herein again.

Figure 6:
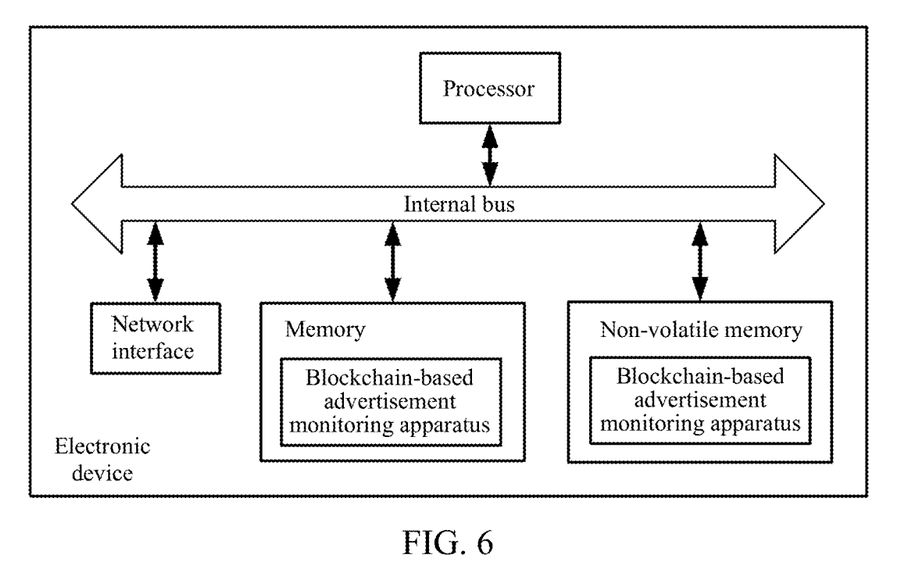
FIG. 6 is a schematic structural diagram of an electronic device, according to an embodiment of the present specification.

FIG. 6 is a schematic structural diagram of an electronic device according to an embodiment of this specification. Referring to FIG. 6, at the hardware level, the electronic device includes a processor, and In some embodiments, includes an internal bus, a network interface, and a memory. The memory may include a random-access memory (RAM), or may further include a non-volatile memory, for example, at least one magnetic disk memory. Certainly, the electronic device may further include hardware required for other services.

The processor, the network interface, and the memory may be connected to each other through the internal bus. The internal bus may be an industry standard architecture (ISA) bus, a peripheral component interconnect (PCI) bus, or an extended industry standard architecture (EISA) bus. The bus may be classified into an address bus, a data bus, a control bus, and the like. For ease of illustration, in FIG. 6, the bus is represented by using only one double-sided arrow. This, however, does not indicate that there is only one bus or only one type of bus.

The memory is configured to store a program. Specifically, the program may include program code, where the program code includes a computer operation instruction.

The memory may include an internal memory and a non-volatile memory, and provide instructions and data to the processor.

The processor reads a corresponding computer program from the non-volatile memory into the memory and then executes the computer program, to form a blockchain-based advertisement monitoring apparatus at the logic level. The processor executes the program stored in the memory and is configured to perform the following operations: obtaining a screenshot image of a target advertisement being played by a playing device and identification information of the playing device; generating blockchain verification information based on the screenshot image and the identification information, the blockchain verification information being content for verifying the screenshot image and the identification information; and uploading the blockchain verification information to a blockchain.

The foregoing blockchain-based advertisement monitoring method disclosed in the embodiments shown in FIG. 1 and FIG. 2 of this specification may be applied to a processor or implemented by a processor. The processor may be an integrated circuit chip and has a signal processing capability. In an implementation process, steps of the foregoing method may be implemented by using a hardware integrated logic circuit in the processor or instructions in a form of software. The processor may be a general processor, including a central processing unit (CPU), a network processor (NP), and the like; or may further be a digital signal processor (DSP), an application-specific integrated circuit (ASIC), a field programmable gate array (FPGA), or another programmable logical device, discrete gate or transistor logical device, or discrete hardware component. The processor can implement or execute each method, step, and logic block diagram disclosed in one or more embodiments in the specification. The general-purpose processor may be a microprocessor, or the processor may be any conventional processor or the like. Steps of the method disclosed with reference to one or more embodiments in the specification may be directly implemented by a hardware decoding processor, or implemented by a combination of hardware in the decoding processor and a software module. The software module may be located in a mature storage medium in the art, such as a RAM, a flash memory, a ROM, a programmable ROM, an electrically erasable programmable memory, or a register. The storage medium is located in the memory, and the processor reads information in the memory and completes the steps in the foregoing methods in combination with hardware of the processor.

The electronic device may further perform the blockchain-based advertisement monitoring method shown in FIG. 1 and FIG. 2, and this is not described in the specification again.

In addition to a software implementation, the electronic device in the specification does not exclude other implementations, for example, a logic device or a combination of software and hardware. In other words, an entity executing the following processing procedure is not limited to the logic units, and may also be hardware or logic devices.

Figure 7:
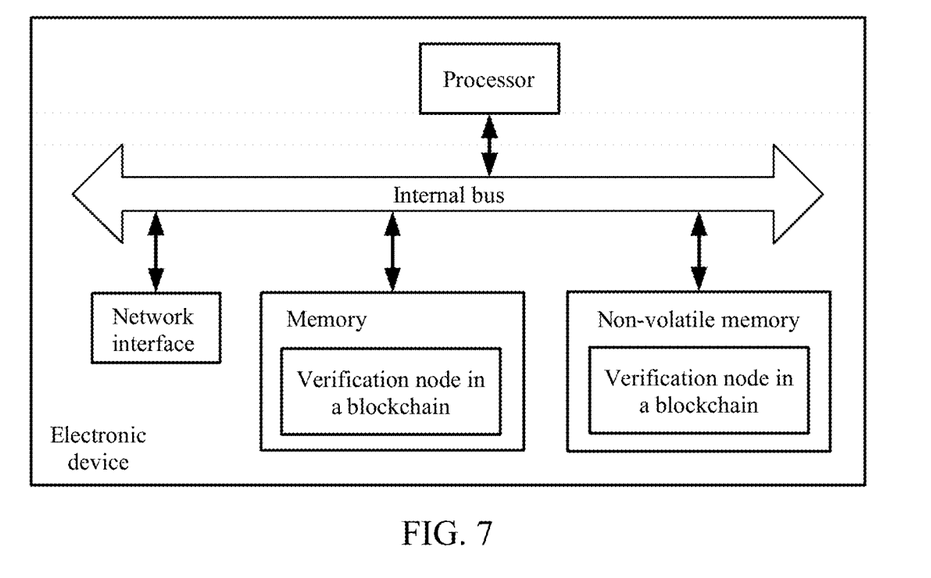
FIG. 7 is a schematic structural diagram of another electronic device, according to an embodiment of the present specification.

FIG. 7 is a schematic structural diagram of an electronic device according to an embodiment of this specification. Referring to FIG. 7, at the hardware level, the electronic device includes a processor, and In some embodiments, includes an internal bus, a network interface, and a memory. The memory may include a memory, for example, a random-access memory (RAM), or may further include a non-volatile memory, for example, at least one magnetic disk memory. Certainly, the electronic device may further include hardware required for other services.

The processor, the network interface, and the memory may be connected to each other through the internal bus. The internal bus may be an industry standard architecture (ISA) bus, a peripheral component interconnect (PCI) bus, or an extended industry standard architecture (EISA) bus. The bus may be classified into an address bus, a data bus, a control bus, and the like. For ease of illustration, in FIG. 7, the bus is represented by using only one double-sided arrow. This, however, does not indicate that there is only one bus or only one type of bus.

The memory is configured to store a program. Specifically, the program may include program code, where the program code includes a computer operation instruction. The memory may include an internal memory and a non-volatile memory, and provide instructions and data to the processor.

The processor reads a corresponding computer program from the non-volatile memory into the memory and then executes the computer program, to form a verification node in a blockchain at the logic level. The processor executes the program stored in the memory and is specifically configured to perform the following operations: obtaining blockchain verification information of a target advertisement from a blockchain, the blockchain verification information including identification information of a playing device of the target advertisement; obtaining an advertisement resource corresponding to the identification information of the playing device; and verifying, based on the blockchain verification information and the advertisement resource corresponding to the identification information of the playing device, a status of playing of the target advertisement by the playing device.

The foregoing blockchain-based advertisement monitoring method disclosed in the embodiments shown in FIG. 3 of this specification may be applied to a processor or implemented by a processor. The processor may be an integrated circuit chip and has a signal processing capability. In an implementation process, steps of the foregoing method may be implemented by using a hardware integrated logic circuit in the processor or instructions in a form of software. The processor may be a general processor, including a central processing unit (CPU), a network processor (NP), and the like; or may further be a digital signal processor (DSP), an application-specific integrated circuit (ASIC), a field programmable gate array (FPGA), or another programmable logical device, discrete gate or transistor logical device, or discrete hardware component. The processor can implement or execute each method, step, and logic block diagram disclosed in one or more embodiments in the specification. The general-purpose processor may be a microprocessor, or the processor may be any conventional processor or the like. Steps of the method disclosed with reference to one or more embodiments in the specification may be directly implemented by a hardware decoding processor, or implemented by a combination of hardware in the decoding processor and a software module. The software module may be located in a mature storage medium in the art, such as a RAM, a flash memory, a ROM, a programmable ROM, an electrically erasable programmable memory, or a register. The storage medium is located in the memory, and the processor reads information in the memory and completes the steps in the foregoing methods in combination with hardware of the processor.

The electronic device may further perform the blockchain-based advertisement monitoring method shown in FIG. 3, and this is not described in the specification again.

In addition to a software implementation, the electronic device in the specification does not exclude other implementations, for example, a logic device or a combination of software and hardware. In other words, an entity executing the following processing procedure is not limited to the logic units, and may also be hardware or logic devices.

The foregoing descriptions are merely exemplary embodiments of the specification, but are not intended to limit the protection scope of the specification. Any modification, equivalent replacement, or improvement made within the spirit and principle of one or more embodiments of the specification shall fall within the protection scope of one or more embodiments of the specification.

The system, the apparatus, the module or the unit described in the foregoing embodiments can be specifically implemented by a computer chip or an entity or implemented by a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

The computer readable medium includes a persistent medium and a non-persistent medium, a removable medium and a non-removable medium, which may implement storage of information by using any method or technology. The information may be a computer readable instruction, a data structure, a module of a program or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition in the present disclosure, the computer-readable medium does not include transitory computer readable media (transitory media), such as a modulated data signal and a carrier.

The terms "include," "comprise" and any other variants mean to cover the non-exclusive inclusion. Thereby, the process, method, article, or device which include a series of elements not only include those elements, but also include other elements which are not clearly listed, or include the inherent elements of the process, method, article and device. Without further limitation, the element defined by a phrase "include one" does not exclude other same elements in the process, method, article or device which include the element.

The embodiments in this specification are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly; for related parts, reference may be made to partial descriptions in the method embodiment.

What is claimed is:

1. A blockchain-based advertisement monitoring method, comprising:
   obtaining, by a playing device, an advertisement resource;
   at each of a plurality of different time points while playing the advertisement resource, collecting, by the playing device, a screenshot of the advertisement resource;
   combining, by the playing device, the screenshot, a device identifier of the playing device, and a timestamp of the screenshot;
   generating, by the playing device, a digest by applying a hash algorithm on the combination;
   generating, by the playing device, a first signature by encrypting the digest with a private encryption key of the playing device;
   generating, by the playing device, a second signature by encrypting the device identifier of the playing device using the private encryption key of the playing device;
   obtaining, by the playing device, a length and a width of the screenshot;
   generating, by the playing device, a third signature by encrypting the length and the width of the screenshot with the private encryption key of the playing device;
   generating, by the playing device, verification information comprising the first signature, the second signature, the length and the width of the screenshot, and the third signature; and
   uploading, by the playing device, the verification information to a blockchain network.

2. The method of claim 1, wherein the obtaining the advertisement resource comprises:
   sending the device identifier of the playing device to a cloud platform; and
   receiving the advertisement resource from the cloud platform, wherein the cloud platform stores a mapping between the advertisement resource and the device identifier of the playing device.

3. The method of claim 1, wherein the generating the verification information comprises:
   generating the verification information comprising the first signature, the second signature, the device identifier, the length and the width of the screenshot, and the third signature.

4. The method of claim 1, wherein the generating the verification information comprises:
   generating the verification information comprising the first signature, the second signature, the third signature, the length and the width of the screenshot, the device identifier, and the digest.

5. The method of claim 1, wherein the verification information further comprises:
   the timestamp.

6. A system of a playing device for blockchain-based advertisement monitoring, comprising one or more processors and one or more non-transitory computer-readable memories coupled to the one or more processors and configured with instructions executable by the one or more processors to cause the system to perform operations comprising:
   obtaining an advertisement resource;
   at each of a plurality of different time points while playing the advertisement resource, collecting a screenshot of the advertisement resource;
   combining the screenshot, a device identifier of the playing device, and a timestamp of the screenshot;
   generating a digest by applying a hash algorithm on the combination;

generating a first signature by encrypting the digest with a private encryption key of the playing device;

generating a second signature by encrypting the device identifier of the playing device using the private encryption key of the playing device;

obtaining a length and a width of the screenshot;

generating a third signature by encrypting the length and the width of the screenshot with the private encryption key of the playing device;

generating verification information comprising the first signature, the second signature, the length and the width of the screenshot, and the third signature; and uploading the verification information to a blockchain network.

7. The system of claim 6, wherein the generating the verification information comprises:

generating the verification information comprising the first signature, the second signature, the device identifier, the length and the width of the screenshot, and the third signature.

8. The system of claim 6, wherein the generating the verification information comprises:

generating the verification information comprising the first signature, the second signature, the third signature, the length and the width of the screenshot, the device identifier, and the digest.

9. A non-transitory computer-readable storage medium of a playing device for blockchain-based advertisement monitoring, configured with instructions executable by one or more processors to cause the one or more processors to perform operations comprising:

obtaining an advertisement resource;

at each of a plurality of different time points while playing the advertisement resource, collecting a screenshot of the advertisement resource;

combining the screenshot, a device identifier of the playing device, and a timestamp of the screenshot;

generating a digest by applying a hash algorithm on the combination;

generating a first signature by encrypting the digest with a private encryption key of the playing device;

generating a second signature by encrypting the device identifier of the playing device using the private encryption key of the playing device;

obtaining a length and a width of the screenshot;

generating a third signature by encrypting the length and the width of the screenshot with the private encryption key of the playing device;

generating verification information comprising the first signature, the second signature, the length and the width of the screenshot, and the third signature; and uploading the verification information to a blockchain network.

10. The storage medium of claim 9, wherein the generating the verification information comprises:

generating the verification information comprising the first signature, the second signature, the device identifier, the length and the width of the screenshot, and the third signature.

11. The system of claim 6, wherein the obtaining the advertisement resource comprises:

sending the device identifier of the playing device to a cloud platform; and receiving the advertisement resource from the cloud platform, wherein the cloud platform stores a mapping between the advertisement resource and the device identifier of the playing device.

12. The system of claim 6, wherein the verification information further comprises the timestamp.

13. The storage medium of claim 9, wherein the obtaining the advertisement resource comprises:

sending the device identifier of the playing device to a cloud platform; and receiving the advertisement resource from the cloud platform, wherein the cloud platform stores a mapping between the advertisement resource and the device identifier of the playing device.

\* \* \* \* \*